Figure 1:
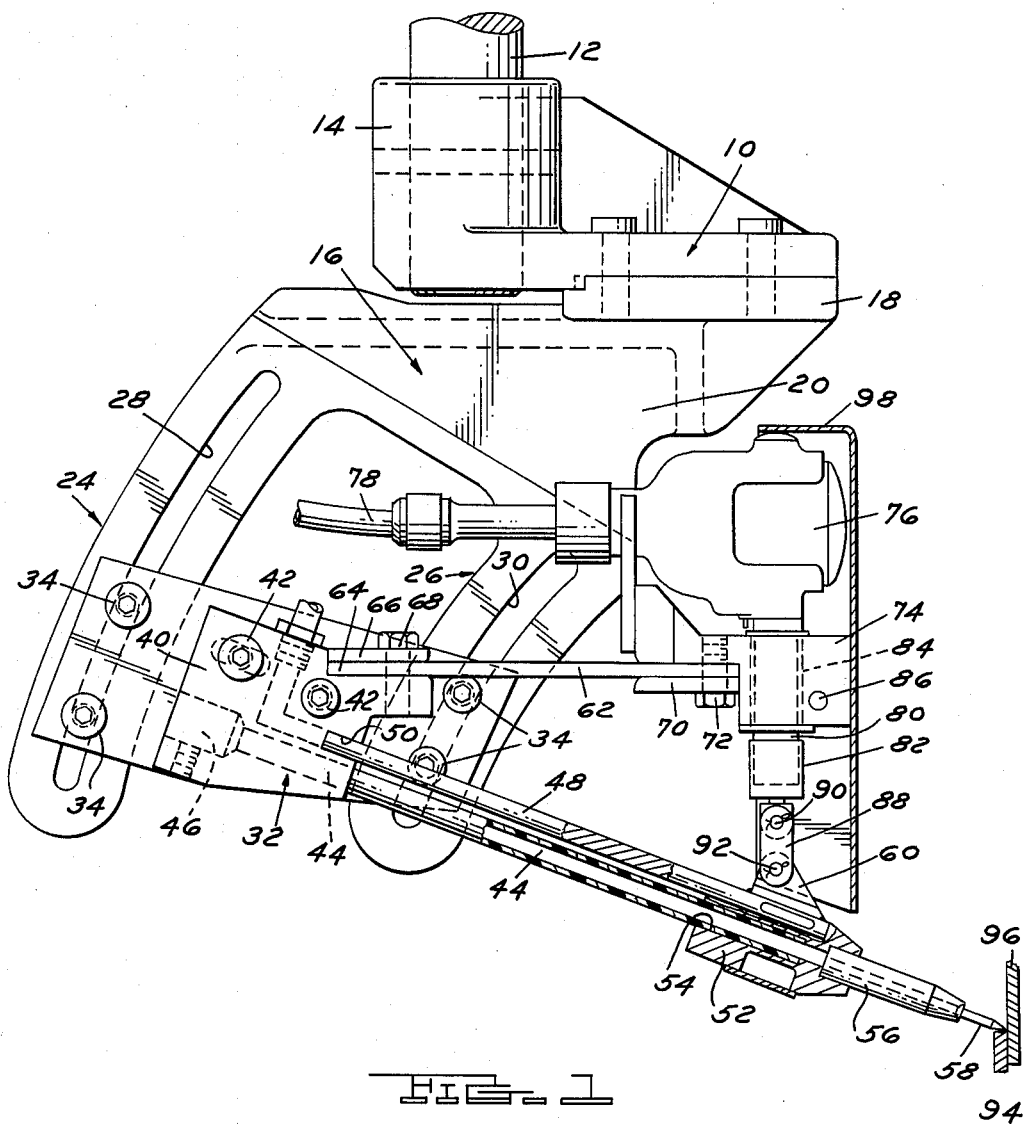

May 24, 1966  J. H. BREMS  3,253,117
TORCH MOUNT FOR WELDING

Filed March 9, 1964  2 Sheets-Sheet 1

INVENTOR.
JOHN H. BREMS
BY
Barnes, Kisselle, Raisch & Choate
ATTORNEYS

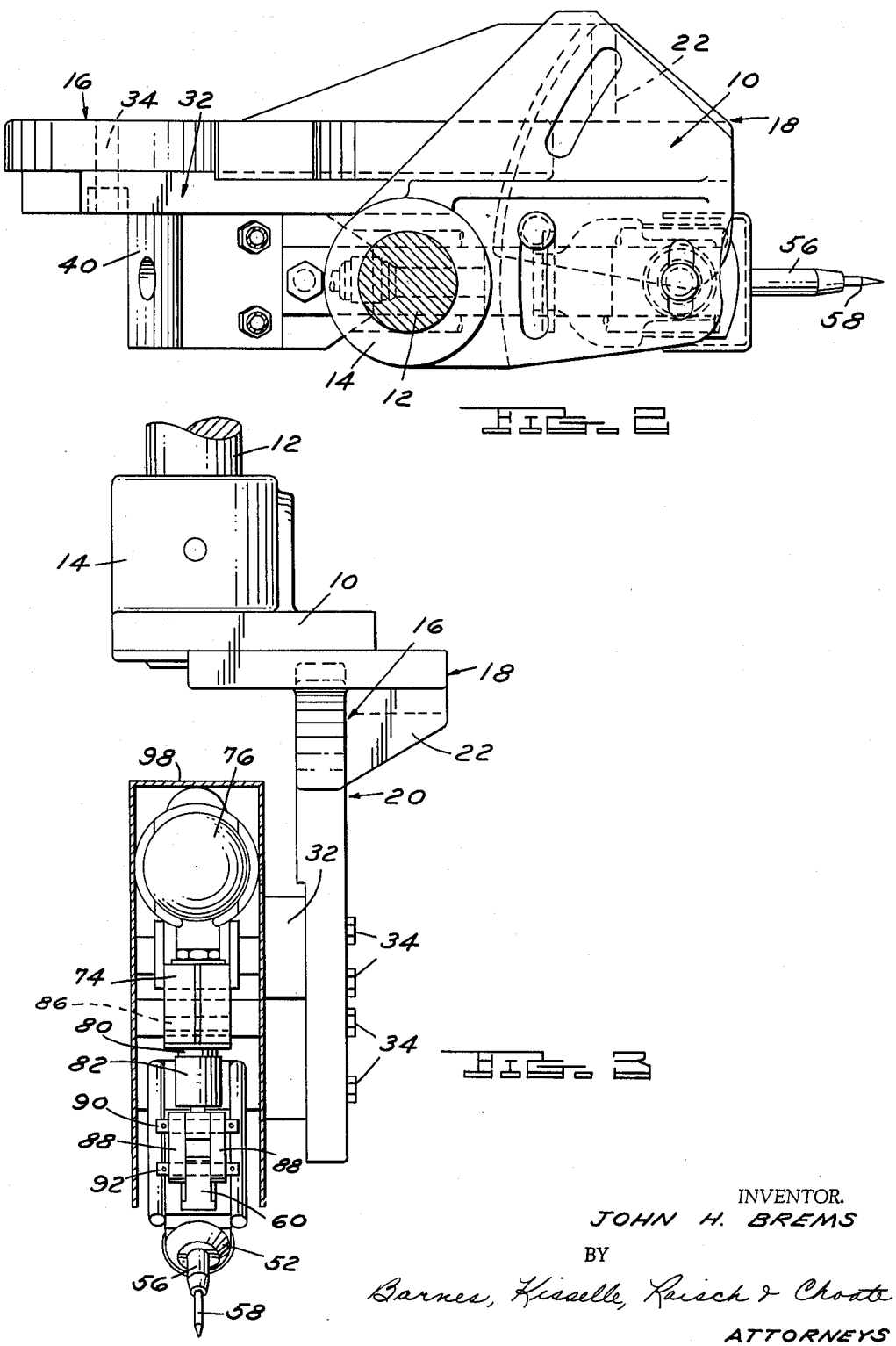

3,253,117
TORCH MOUNT FOR WELDING
John H. Brems, 32867 White Oaks Trail (Village of Beverly Hills), Birmingham, Mich.
Filed Mar. 9, 1964, Ser. No. 350,439
5 Claims. (Cl. 219—130)

This invention relates to a torch mount for arc welding apparatus and the like.

It is known in welding that where a particular seam is being generated by the welding operation, it is desirable to move the weld rod transversely to the seam as it progresses along the seam in order to distribute the molten metal and provide an effective bond. There have been attempts to accomplish this by a mechanical oscillation of the welding torch which holds the rod but this has proved to be difficult to control because the oscillation has caused vibration of the entire welding head and the more rapid the oscillation, the greater the vibration of the support. This has been destructive and distracting and has interfered with other automatic functions of the machine.

It is an object of the present invention to provide this oscillation in a way which avoids unwanted vibration and which permits the cycles of oscillation to be multiplied many times that which were possible with the previous devices.

It is a further object to provide an oscillation mechanism which is self-contained and which provides a harmonic dynamic balance which is readily controlled at any speed of operation.

Other objects and features of the invention relating to details of construction and operation will be apparent in the following description and claims.

Drawings accompany the disclosure and the various views thereof may be briefly described as:

FIGURE 1, a side view of a welding torch assembly partially in section illustrating the mechanism.

FIGURE 2, a top view of the mechanism.

FIGURE 3, an end view of the welding torch.

Referring to the drawings:

In FIGURE 1, a rigid reinforced bracket 10 is supported on a heavy vertical rod 12, the bracket 10 having a relatively mass collar 14 and locked on to the rod 12 which is associated with a welding machine in any conventional manner. Fastened to the bracket 10 is a secondary supporting bracket 16 having a horizontal plate 18 to relate to the bracket 10 in such a way that the parts can be adjusted relative to each other in a standard way. Depending from the plate 18 is a vertical plate 20 reinforced to the supporting plate by a suitable gusset 22, FIGURE 3. The plate 20 has two depending slightly arcuate projections 24 and 26 each of which, respectively, has an arcuate slot 28 and 30.

These projections 24 and 26 are in the same plane and mounted on them is a torch supporting bracket 32 supported by four bolts 34. These bolts can be loosened to adjust the angle of the bracket 32. Bolted to the adjustable bracket plate 32 is a supporting block 40 held in place by bolts 42. This block 40 is bored out to receive a plastic tube 44 formed of nylon or some other similarly dense plastic to serve as a guide for welding wire which can pass into the block through an opening 46.

Just above the tube 44 is an arm 48 comprising a resilient bar of metal having a cantilever mount in a slot recess 50 in the block 40. This arm 48, which parallels the rod tube 44, is solidly mounted in the block either by a weld or by screws. At the end of this arm or beam 48 is mounted a welding rod collar 52 which is rigidly mounted to the beam at its distal end. This collar has a recess in the top portion thereof to receive the end of the beam 48 and has a recess 54 to receive the lower end of the tube 44. At the end of the collar is a nose or nozzle portion 56 to serve as a terminal guide for welding rod 58. At the top of the collar 52 is an upstanding plate 60 which will be referred to later.

Also cantilevered in the block 40 is an arm 62 comprising a resilient bar of metal, the proximal end 64 of this arm being recessed into the block 40 and clamped by a reinforcing plate 66 and a bolt 68. This arm 62 extends outwardly and at its distal end has a reinforcing plate 70 transfixed along with the beam by a bolt 72 which anchors into a base bracket 74 extending outwardly from the beam 62 and supporting a housing 76 which contains a rotary commercial eccentric device driven by a power source leading in at 78. The eccentric device has an output rod 80 extending downwardly through the mounting block 74 and carrying an adjustable collar 82. The output rod 80 is mounted in a bearing collar 84 in block 74. Block 74 is preferably a split block which is held in clamping relation to the bearing 84 by a bolt 86. Depending from the adjustable collar 82 are clevis links 88 supported at the top on a pivot pin 90 and linked by a pivot pin 92 to the upstanding plate 60.

In FIGURE 1, the welding rod 58 is shown in relation to a joint to be welded by the plates 94 and 96. It is desirable to have a cross seam oscillation at this joint of from 1/16 to 1/8". This can be accomplished by tuning the resilient supports or beams 48 and 62 taking into consideration the resilience thereof and the weight of the elements mounted thereon so that the natural frequency of the two beams, i.e., the ratio of mass to stiffness, is essentially mathematically equal. This takes into consideration the actual weight of the parts and the elasticity of the beams. When these parts are placed in a state of approximate dynamic balance, the oscillation of the output shaft 80 will thus cause the beams to move toward and away from each other in a rapid oscillation (balanced harmonic motion) which can vary at will and can be carried up to as high as 4,000 oscillations per minute. With this state of dynamic balance of the parts, each beam is moved outwardly and inwardly simultaneously so that there is very little vibration transmitted to the bracket 16 and the supporting bracket 10. A guard plate 98 is disposed over and in front of the forward assembly including the oscillator 76 and the block 74 to protect the parts against the sparks and flying particles that may result from the welding operation.

It will thus be seen that the support with the diverging cantilevered arms is the mount for both the welding rod and torch nose adjacent the weld, and also for the oscillator and its output which provides an expansible-contractible link between the arms so that a balanced harmonic action can be maintained at different frequencies to effect relative cross-seam action of the rod at the welding seam.

The load on the standard supporting structure is minimal and the cycles may be increased from about 200 cycles in old devices to 4,000 or more cycles with the present device without undesirable vibration of the mount.

In the appended claims, I have attempted to delineate the novelty of my device over known prior art for the purpose of defining the protected area as well as notifying the public relative to the unprotected area. However, I do intend by this claiming to cover any colorable variations, reversal of parts, or equivalents of the device which are within the scope and spirit of this disclosure and not anticipated by the prior art.

What I claim is:

1. A welding torch construction for arc welding and the like which comprises:
    (a) a support, (b) spaced resilient mounting arms cantilevered from said support,
(c) guide means on one of said arms for a welding rod, and
(d) means associating said arms movable to shift said arms toward and away from each other to impart an oscillation to both, said arms being dynamically balanced relative to resilience and load.

2. A welding torch construction for arc welding and the like which comprises:
(a) a support,
(b) spaced resilient mounting arms cantilevered from said support,
(c) guide means on one of said arms for a welding rod, and
(d) contractible-expansible means linking said arms at points spaced from said support to shift said arms toward and away from each other at a rapid rate to impart an oscillation to a welding rod on said one of said arms, said arms being dynamically balanced relative to resilience and load.

3. A welding torch construction for arc welding and the like which comprises:
(a) a support,
(b) spaced resilient mounting arms cantilevered from said support,
(c) guide means on one of said arms for a welding rod, and
(d) means to move said arms toward and away from each other harmonically in a balanced vibratory motion.

4. A welding torch construction as defined in claim 3 in which the last means comprises an oscillator mounted on one arm having an output shaft, and linkage means connecting said output shaft and said other arm.

5. A welding torch construction for arc welding and the like which comprises:
(a) a support,
(b) spaced resilient arms cantilevered from said support,
(c) means on said support and extending along one arm to guide a welding rod to a welding point adjacent the end of said one arm,
(d) an oscillator mounted on said other arm having an output shaft, and
(e) means linking said output shaft and said one arm to move said arm harmonically in a balanced vibratory motion.

References Cited by the Examiner

UNITED STATES PATENTS

| | | | |
|---|---|---|---|
| 1,318,147 | 10/1919 | Herrick | 315—347 |
| 1,933,340 | 10/1933 | Raymond | 219—124 |
| 1,984,809 | 12/1934 | Requa | 219—130 |

RICHARD M. WOOD, *Primary Examiner.*